US012768057B2

(12) United States Patent
Ballantine et al.

(10) Patent No.: US 12,768,057 B2
(45) Date of Patent: Oct. 20, 2026

(54) URBAN DENSELY PACKED HYDROGEN GENERATION

(71) Applicant: Ohmium International, Inc., Newark, CA (US)

(72) Inventors: Arne Ballantine, Incline Village, NV (US); Frederick Paul Freeland, Jr., Port Orchard, WA (US); Chockkalingam Karuppaiah, Fremont, CA (US)

(73) Assignee: Ohmium International, Inc., Newark, CA (US)

( * ) Notice: Subject to any disclaimer, the term of this patent is extended or adjusted under 35 U.S.C. 154(b) by 848 days.

(21) Appl. No.: 17/722,662

(22) Filed: Apr. 18, 2022

(65) Prior Publication Data

US 2022/0333256 A1 Oct. 20, 2022

Related U.S. Application Data

(60) Provisional application No. 63/175,597, filed on Apr. 16, 2021.

(51) Int. Cl.

*H01M 8/00* (2016.01)
*C25B 1/04* (2021.01)
*C25B 9/70* (2021.01)
*C25B 15/021* (2021.01)
*H01M 8/0656* (2016.01)
*H01M 16/00* (2006.01)

(52) U.S. Cl.

CPC .................. *C25B 9/70* (2021.01); *C25B 1/04* (2013.01); *C25B 15/021* (2021.01); *H01M 8/0656* (2013.01); *H01M 16/003* (2013.01)

(58) Field of Classification Search

CPC ........... C25B 9/70; C25B 15/021; C25B 1/04; H01M 8/04029; H01M 8/04082; H01M 16/003; H01M 8/0267; H01M 10/613; Y01E 60/50; Y02E 60/36; Y02E 60/14

See application file for complete search history.

(56) References Cited

U.S. PATENT DOCUMENTS 3,110,582 A 11/1963 Simpson
6,889,752 B2 5/2005 Stoller
8,669,499 B2 3/2014 Conrad
11,309,553 B2 * 4/2022 Ballantine ......... H01M 8/04074
2003/0015418 A1 1/2003 Tseng et al.

(Continued)

FOREIGN PATENT DOCUMENTS

EP 4323563 A1 2/2024
JP 2005523568 A 8/2005

(Continued)

OTHER PUBLICATIONS

PCT/US2022/025182, Arne Ballantine, Urban Densely Packed Hydrogen Generation, Apr. 18, 2022.

(Continued)

*Primary Examiner* — Nicholas P D'Aniello
(74) *Attorney, Agent, or Firm* — Polsinelli LLP

(57) ABSTRACT

Described herein is a modular system for producing hydrogen or other gases in a densely-packed space, such as an urban setting. The system includes a plurality of hydrogen cabinets installed in a stacked fashion and at least one duct assembly to safely exhaust gases produced by the system.

20 Claims, 3 Drawing Sheets

(56) References Cited

U.S. PATENT DOCUMENTS

| | | | | |
|---|---|---|---|---|
| 2008/0121525 | A1 | 5/2008 | Doland | |
| 2008/0229748 | A1 | 9/2008 | Elckhoff | |
| 2009/0058098 | A1* | 3/2009 | Flynn | H05K 7/20745 290/1 R |
| 2009/0324997 | A1* | 12/2009 | Tsuji | H01M 8/0606 429/2 |
| 2010/0173225 | A1 | 7/2010 | Rosenband et al. | |
| 2011/0262842 | A1* | 10/2011 | Yang | H01M 8/04052 429/515 |
| 2013/0084508 | A1* | 4/2013 | Yukimasa | C01B 3/384 429/410 |
| 2013/0115142 | A1 | 5/2013 | Chou et al. | |
| 2015/0072254 | A1* | 3/2015 | Suzuki | H01M 8/0656 429/422 |
| 2017/0314144 | A1 | 11/2017 | Yu | |
| 2018/0105418 | A1* | 4/2018 | Zhang | H01M 8/22 |
| 2021/0104764 | A1* | 4/2021 | Allo | H01M 8/0656 |
| 2022/0112614 | A1* | 4/2022 | Drozdzik | C25B 9/17 |
| 2022/0311025 | A1* | 9/2022 | Yamano | H01M 8/24 |
| 2025/0137152 | A1 | 5/2025 | Ballantine et al. | |

FOREIGN PATENT DOCUMENTS

| | | | |
|---|---|---|---|
| JP | 2007523259 | A | 8/2007 |
| JP | 2019210529 | A | 12/2019 |
| JP | 2021042447 | A | 3/2021 |
| JP | 2024518273 | A | 5/2024 |
| WO | 2004075615 | A1 | 9/2004 |
| WO | 2014128813 | A1 | 8/2014 |
| WO | 2018236649 | A1 | 12/2018 |
| WO | WO 2020/163771 | | 8/2020 |
| WO | WO 2022/221755 | | 10/2022 |
| WO | WO 2025/091024 | | 5/2025 |

OTHER PUBLICATIONS

PCT Application No. PCT/US2022/025182 International Preliminary Report on Patentability dated Oct. 26, 2023.

PCT/US22/25182, Frederick Paul Freeland, Urban Densely Packed Hydrogen Generation, Apr. 18, 2022.

U.S. Appl. No. 18/929,045, Arne Ballantine, Method and Structure for Extreme Weather Hydrogen Generation Facility, filed Oct. 28, 2024.

PCT/US24/53242, Arne Ballantine, Method and Structure for Extreme Weather Hydrogen Generation Facility, Oct. 28, 2024.

PCT Application No. PCT/US2024/053242 International Search Report and Written Opinion dated Dec. 4, 2024.

PCT Application No. PCT/US2022/025182 International Search Report and Written Opinion dated Jul. 1, 2022.

JP Application No. 2023-562700, Notice of Reasons for Rejection dated Dec. 12, 2025.

European Application No. 22789075.3, Extended European Search Report dated Jul. 7, 2025.

PCT Application No. PCT/US2024/053242, International Preliminary Report on Patentability dated May 7, 2026.

JP Application No. 2023-562700, Notice of Reasons for Rejection dated Jun. 17, 2026.

* cited by examiner

URBAN DENSELY PACKED HYDROGEN GENERATION

CROSS-REFERENCE TO RELATED APPLICATIONS

This application claims priority to U.S. Provisional Application No. 63/175,597, filed Apr. 16, 2021, the entire contents of which are incorporated herein by reference.

FIELD OF THE DISCLOSURE

The present disclosure relates to systems for safely generating hydrogen in densely-packed settings.

BACKGROUND

For economical implementation, hydrogen-based applications require that the source of hydrogen generation be closely coupled with the hydrogen use. When hydrogen generation installations become very large as measured by area, they can be limited by available land space or economical cost. This prevents further scaling of the hydrogen-based application.

In solutions of the prior art, hydrogen is generally produced in large, centrally-located reformer-based or chloro-alkaline plants. Distribution from these facilities requires infrastructure that leads to higher costs. In other solutions of the prior art, hydrogen is created in water electrolysis-based generators. However, in these installations, the electrolyzers are positioned on the ground; thus, the installations are unable to achieve a high footprint density and cannot scale efficiently.

What is needed is a hydrogen generation system that is located close to applications for hydrogen use, and is scalable while achieving a high footprint density.

SUMMARY OF THE DISCLOSURE

Provided herein is a system for hydrogen generation in densely-packed settings. The system comprises a plurality of hydrogen cabinets, each hydrogen cabinet comprising a hydrogen generator; a plurality of electronics cabinets; and at least one duct assembly operably connected to the plurality of hydrogen cabinets. The plurality of hydrogen cabinets are positioned vertically relative to one another to form at least one hydrogen stack. Exhaust from the plurality of hydrogen cabinets is directed into the duct assembly.

In some embodiments, the plurality of electronics cabinets are positioned vertically relative to one another to form an electronics stack. A system of the present disclosure may include at least one hydrogen stack. In such an electronics stack configuration, the electronics cabinets may be on different floors or levels of the installation. Further, the system may comprise a plurality of hydrogen stacks. In some aspects, each of the hydrogen stacks may be separated by an aisle.

Regarding the duct assembly, the at least one duct assembly comprises an inner wall, an outer wall, and one or more fans operable to direct air into the duct assembly. In some aspects, the duct assembly further comprises additional piping or tubing operable to prevent reverse flow from the duct. In addition, the at least one duct assembly may further comprise one or more cooling loops. In further aspects, the one or more fans is operable to direct air to the one or cooling loops. In some examples, the one or more cooling loops are disposed between the inner wall and the outer wall of the at least one duct assembly. And the one or more cooling loops may be operably connected to a heat capture loop.

In some configurations, the exhaust from the plurality of hydrogen cabinets comprises at least one of air, hydrogen, oxygen, and combinations thereof. The system may further comprise an input power switchgear. Moreover, the system may further comprise one or more compressors operably connected to the plurality of hydrogen stacks.

In further embodiments, the system further comprises at least one water purification unit. In some aspects, the at least one water purification unit is operably connected to the plurality of hydrogen stacks. In some additional aspects, the system further comprises at least one booster pump, wherein the at least one booster pump is operable to provide purified water to each of the plurality of hydrogen cabinets at a uniform pressure. The system may further comprise a water source operably connected to the plurality of hydrogen cabinets. In some aspects, the water source comprises an adsorber operable to adsorb water from the air. In some additional aspects, the water source comprise a waste processing unit. In still further aspects, the water source comprises rainwater.

Structurally, the system may further comprise a plurality of panels. In some aspects, the plurality of panels comprises photovoltaic panels. The system may further comprise at least one hydrogen fuel cell generator cabinet. In yet another configuration, the system further comprises a heat storage system. In some aspects, the heat storage system comprises a saline solution.

BRIEF DESCRIPTION OF THE FIGURES

The various objects, features, and advantages of the present disclosure set forth herein will be apparent from the following description of embodiments of those inventive concepts, as illustrated in the accompanying drawings. It should be noted that the drawings are not necessarily to scale and may be representative of various features of an embodiment, the emphasis being placed on illustrating the principles and other aspects of the inventive concepts. Also, in the drawings the like reference characters may refer to the same parts or similar throughout the different views. It is intended that the embodiments and figures disclosed herein are to be considered illustrative rather than limiting.

FIG. 1A is an isometric view of a system of the present disclosure. FIG. 1B is a top-down cutaway view of a system of the present disclosure. FIG. 1C is a side cutaway view of a system of the present disclosure.

DETAILED DESCRIPTION

Provided herein is a system for generating hydrogen in a densely packed setting, wherein the installation comprising the system has a high footprint density. As used herein, the term "footprint density" refers to the amount of hydrogen generated (in grams, mols, liters, etc.) per unit area of land occupied by the installation ($ft^2$, $m^2$, acres, hectares, etc). As used herein, the term "installation" is used interchangeably with building, facility, and structure. The system is particularly suitable for use in urban settings, where a large number of hydrogen applications may be available within a small area.

The advantages of the system described herein include generating a large amount of hydrogen in a small geographic area. This is especially useful in urban settings where there may be many applications for hydrogen, such as fuel cells for vehicles or other processes. The system of the present disclosure allows for local hydrogen distribution without requiring additional infrastructure needed to build a large-area facility or additional infrastructure for transportation.

Another particular advantage of the system of the present disclosure is the modular nature of the system. Different features may be added, removed, duplicated, etc. to meet the particular needs of the area or to take advantage of local resources, such as water, power, or heat. All features and aspects described herein should be considered to be modular unless stated otherwise.

Figure 1A:
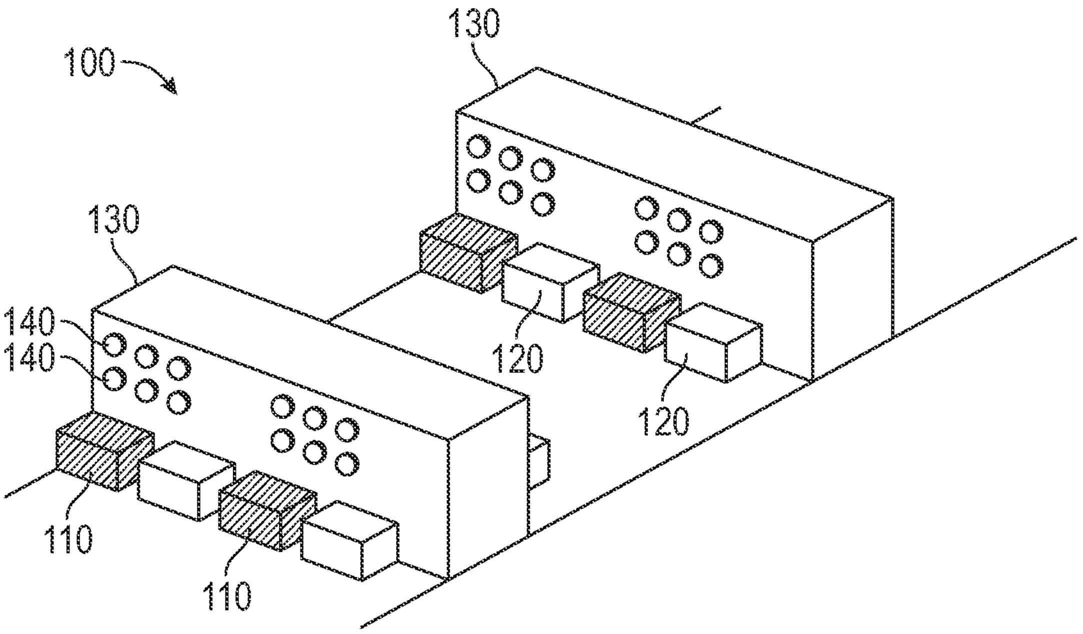
FIGS. 1A-1C show various exemplary designs of a system of the present disclosure.
Figure 1B:
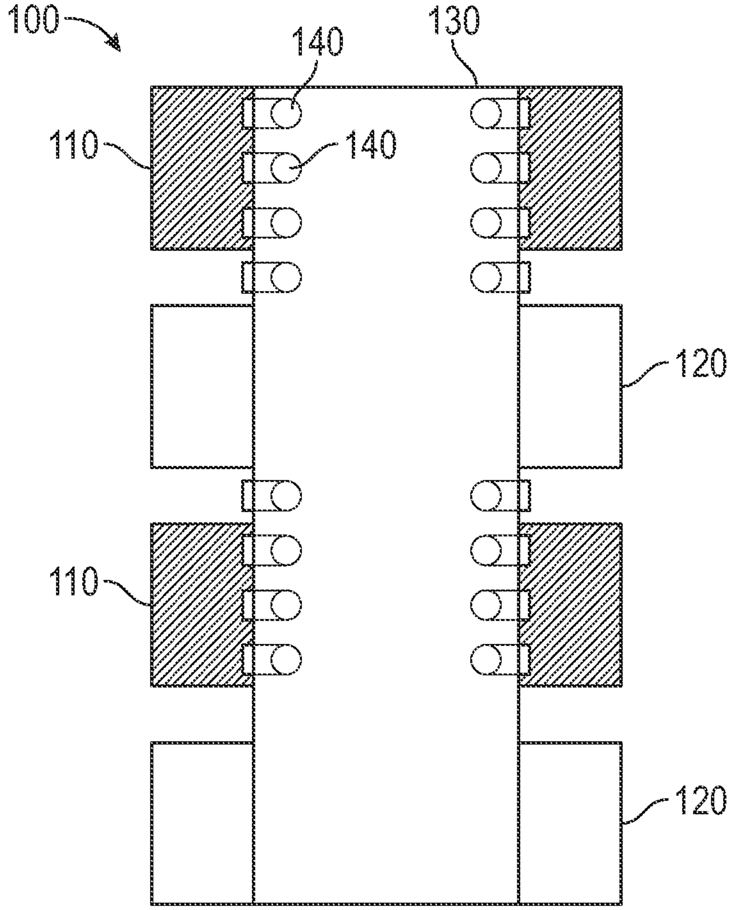

FIG. 1A shows an exemplary system of the present disclosure. The system 100 comprises a plurality of hydrogen cabinets 110. Hydrogen cabinets have been described in the art, for example, in US 20210156038 A1, the entire contents of which are incorporated by reference herein. A hydrogen cabinet of the present disclosure comprises a hydrogen generator. In some embodiments, the hydrogen generator may be an electrolyzer, such as a proton exchange membrane based electrolyzer. In some aspects, when the hydrogen generator is an electrolyzer, the hydrogen cabinet may be operable to separate the hydrogen and oxygen generated by the electrolyzer to avoid forming a combustible mixture within the cabinet.

Figure 2:
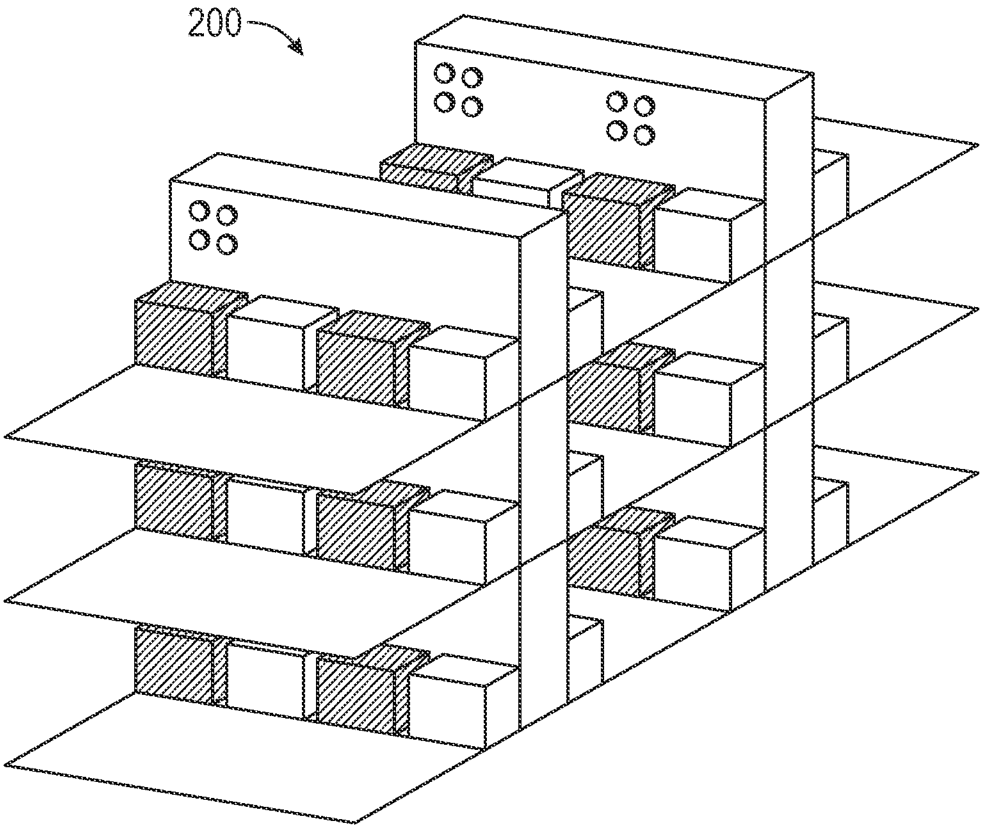
FIG. 2 is an isometric view of an exemplary design for a system of the present disclosure.

Two or more of the plurality of hydrogen cabinets 110 may be positioned vertically relative to each other, i.e., on different floors or levels of the installation, as shown in FIG. 2. This vertical arrangement forms a hydrogen stack. The plurality of hydrogen cabinets in each hydrogen stack may each be separated by a floor, i.e., floor one of the installation may contain one hydrogen cabinet, floor two may contain a hydrogen cabinet, and so on. In some aspects, the hydrogen stack may include at least one hydrogen cabinet on every floor of the installation, or one or more floors may lack a hydrogen cabinet. A system of the present disclosure may include at least one hydrogen stack. In some embodiments, the system may include a plurality of hydrogen stacks.

The exhaust from the plurality of hydrogen cabinets 110 may include hydrogen, oxygen, air, other hydrogen-containing gases, or combinations thereof.

The system 100 further comprises a plurality of electronics cabinets 120. Each of the plurality of electronics cabinets includes AC-DC and DC-DC power converters that are necessary to provide power to each of the plurality of hydrogen cabinets. Additionally, each electronics cabinet may include internal fans that draw air from the environment and blow it across the electronic components within the cabinet to cool the electronic components. This generates exhaust comprising warmed air. The warmed air may be exhausted to the surrounding area to prevent any flow of hydrogen or oxygen from the plurality of hydrogen cabinets 110 into the electronics cabinets. In some embodiments, the plurality of electronics cabinets 120 may be operably connected to the at least one duct assembly, and the warmed air may be exhausted into the duct assembly.

In some embodiments, two or more of the plurality of electronics cabinets 120 may be positioned vertically relative to each other, i.e., on different floors or levels of the installation, as shown in FIG. 2. This vertical arrangement forms an electronics stack. A system of the present disclosure may include at least one electronics stack. In some embodiments, the system may include a plurality of electronics stacks. One advantage of the present invention is that the electronics cabinets and/or hydrogen cabinets installed in a stacked fashion as described herein may safely exhaust gases produced by the system, and wherein the stack may not interfere with the exhaust of any other electronic cabinet, hydrogen cabinet, and/or stack within system. Further, the electronics cabinets and/or hydrogen cabinets installed in a stacked fashion as described herein may not interfere with any necessary heating and cooling (e.g., as caused by weather temperature change or other sources of temperature change) of any other electronic cabinet, hydrogen cabinet, and/or stack within system.

Generally, the number of hydrogen cabinets 110 and the number of electronics cabinets 120 in the system 100 is equal. However, some embodiments may include more hydrogen cabinets 110 than electronics cabinets 120.

In some embodiments, the plurality of hydrogen cabinets 110 and the plurality of electronics cabinets 120 may be placed in an alternating pattern in the installation as shown in FIG. 1A. In other embodiments, the plurality of electronics cabinets 120 may be placed adjacent to the plurality of hydrogen cabinets 110 such that the hydrogen cabinets and the electronics cabinets are lined up horizontally.

The system 100 further comprises at least one duct assembly 130 operably connected to the plurality of hydrogen cabinets 110. The duct assembly 130 functions to direct exhaust gases from the plurality of hydrogen cabinets 110 out of the installation. The duct assembly 130 may be defined by an inner wall and an outer wall, wherein the inner wall defines an enclosed space that the exhaust gases from the plurality of hydrogen cabinets 110 moves through.

Figure 1C:
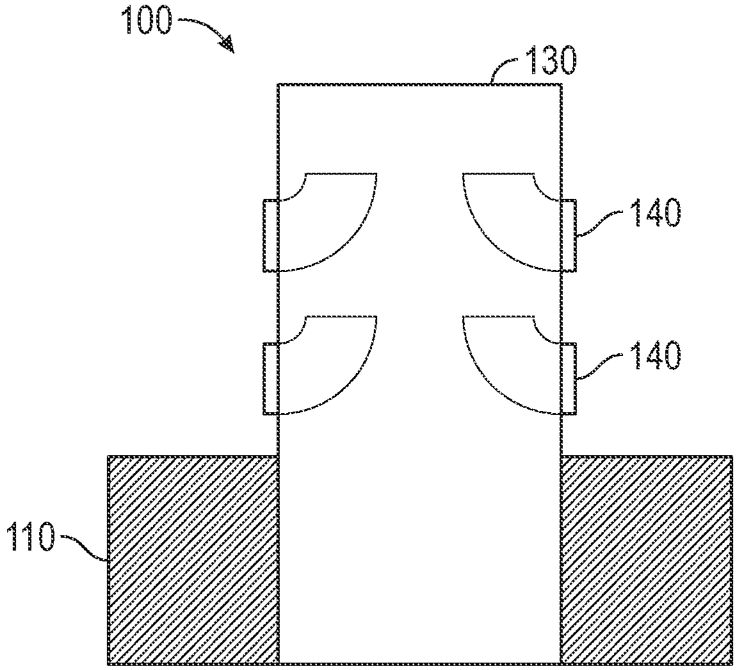

The duct assembly 130 may further comprise one or more fans 140 operable to move air into the duct assembly 130. The one or more fans 140 form a passage from the outer wall to the inner wall of the duct assembly 130 to blow air into the duct assembly 130. The air mixes with the exhaust from the plurality of hydrogen cabinets 110 to dilute the exhaust and prevent the formation of a combustible mixture. The duct assembly may be open to the atmosphere at the uppermost part of the duct assembly, such that the gases in the duct assembly are vented to the atmosphere above the installation. In some embodiments, the duct assembly may further comprise a scrubber to react, capture, or otherwise treat the gases prior to venting them to the atmosphere. In some embodiments, additional piping or tubing may be added to direct the intake of air to the one or more fans into the duct assembly 130, and/or to direct the flow of the air entering the duct assembly 130. In some aspects, the additional piping or tubing may be operable to prevent reverse flow from the duct assembly 130 into the aisles even in the event of a fan failure, as shown in FIG. 1C. In preferred embodiments, the at least one duct assembly 130 may hang from a ceiling or structure above the duct assembly, rather than being mounted to the floor. This arrangement reduces costs and simplifies construction of the duct assembly.

In some embodiments, an aisle may be formed between the hydrogen cabinets operably connected to a first duct assembly 130 and the hydrogen cabinets 110 operably connected to a second duct assembly 130. A system of the present disclosure may include one or more aisles. Each aisle may be large enough to accommodate persons or equipment in order to facilitate repairs and maintenance to the system 100. In some aspects, the aisle is large enough to allow equipment such as a forklift to pass through. In a non-limiting example, the aisle is about 3 meters to about 4 meters wide.

Each of the plurality of hydrogen cabinets 110 may be operable to separate exhausts of hydrogen and oxygen to prevent them from forming a combustible mixture. For example, when the plurality of hydrogen cabinets 110 includes an electrolyzer, the hydrogen formed on the cathode side of the electrolyzer may be directed to an internal volume within the hydrogen cabinet that is separate from the anode side of the electrolyzer. In such embodiments, hydrogen exhaust and oxygen exhaust from each of the plurality of hydrogen cabinets 110 entering the duct assembly may be separate from one another. In some aspects, the hydrogen exhaust stream may be directed into an air stream to mix with air in the duct assembly, and the oxygen exhaust stream may be directed into an air stream to mix with air in the duct assembly. This arrangement further prevents the formation of a combustible mixture of hydrogen and oxygen by diluting each exhaust with air.

In some embodiments, the duct assembly 130 may further comprise one or more cooling loops. The cooling loops may carry a liquid coolant. Gas from the plurality of hydrogen cabinets 110, the plurality of electronics cabinets 110, or from the aisle is directed over the cooling loops to capture heat from the liquid coolant. This then warms the gas before the gas enters the duct assembly. In some embodiments, the liquid coolant may be water, ethylene glycol, propylene glycol, or other liquid coolants known in the art. In some embodiments, portions of the cooling loops may be positioned on the inner wall or on the outer wall of the duct assembly. In some embodiments, the cooling loops may be disposed between the inner wall and the outer wall of the duct assembly 130. In embodiments wherein the duct assembly includes one or more fans, the one or more fans may be operable to direct air to one or more cooling loops.

The one or more cooling loops may comprise any heat exchange system known in the art, such as a radiator, a shell and tube heat exchanger, a finned tube heat exchanger, a double tube heat exchanger, or combinations thereof. In preferred embodiments, the one or more cooling loops comprises a radiator. In an exemplary embodiment, the one or more cooling loops is a radiator disposed between the inner wall and the outer wall of the at least one duct assembly.

In some embodiments, the one or more cooling loops may be operably connected to the plurality of electronics cabinets 120 to provide heat exchange within the plurality of electronics cabinets 120. The liquid coolant in the cooling loops cools the electronics equipment in an electronics cabinet 120, heating the liquid coolant. The liquid coolant then flows to the duct assembly, where the heat of the liquid coolant is exchanged with the exhaust from the plurality of hydrogen cabinets or air from aisle.

The system 100 may further comprise one or more heat capture loops. A heat capture loop may be any system useful for storing and using heat energy. In some aspects, the heat capture loop may include a salt solution having a high heat capacity. The one or more heat capture loops may be operably connected to the plurality of hydrogen cabinets 110 and/or the plurality of electronics cabinets 120 to absorb heat generated by the operation of the plurality of hydrogen cabinets and/or the plurality of electronics cabinets. In some embodiments, the one or more heat capture loops may be operable to prevent freezing of any components of the system during colder seasons. In other embodiments, the one or more heat capture loops may be operable for use in a chemical process, such as the operation of an organic Rankine cycle to produce usable energy for the installation.

The system 100 comprises one or more compressors. The one or more compressors may be any compressors known in the art, including positive displacement compressors such as reciprocating or rotary compressors, centrifugal compressors, or combinations thereof. The compressors may be operably connected to the plurality of hydrogen cabinets 110 and are operable to increase the pressure of the hydrogen and/or other gases produced in the plurality of hydrogen cabinets. In some aspects, one compressor may be located on every floor of the installation, or all compressors for the installation may be located on a dedicated floor. The one or more compressors may be surrounded by a safety isolating wall, such as a concrete barrier wall, to mitigate damage in the event of an explosion.

The system 100 may further comprise at least one water purification unit. The water purification unit is operable to purify water for use in the plurality of hydrogen cabinets 110; accordingly, the at least one water purification unit is operably connected to the plurality of hydrogen cabinets to deliver purified water to the plurality of hydrogen cabinets 110. Methods and systems for water purification, including for applications of hydrogen generation by electrolysis, are well known and described in the art. The at least one water purification unit may utilize any water purification method known in the art, including but not limited to, adsorption, distillation, filtration, reverse osmosis, etc.

The system may comprise one water purification unit operable to deliver purified water to the plurality of hydrogen cabinets. In such aspects, the system may further comprise one or more water booster pumps to provide purified water to the plurality of hydrogen cabinets at an equal water pressure. For example, the water purification unit may be located on the ground floor of the installation, and one or more water booster pump may be used to deliver purified water to the $2^{nd}$ floor, $3^{rd}$ floor, and to the $n^{th}$ floor at an equal water pressure. The one or more water booster pumps may be any pump known in the art capable of delivering purified water, including but not limited to centrifugal pumps, positive displacement pumps, rotary pumps, etc.

The system may comprise a plurality of water purification units, wherein every floor of the installation comprises a water purification unit. In such embodiments, the water pressure of the purified water delivered to the plurality of hydrogen cabinets 110 may be equal.

The system may further comprise at least one water source. In some aspects, the at least one water source may include a municipal water source (i.e., tap water). In some embodiments, the at least one water source may include a process that produces water as a usable byproduct. In other embodiments, the at least one water source may include water adsorbed from ambient air or air delivered to the installation via adsorption methods. Such adsorption methods for capturing water from the air are well known and described in the art. In some additional aspects, the water source may include rainwater collected at the site of the installation. In these aspects, the system may further comprise a rainwater collection system. In still further aspects, the water source may include condensation from within the duct assembly. In these aspects, the system may further comprise a system to collect the condensation from within the duct assembly. The system may further comprise one or more water filters. The at least one water source may be operably connected to the plurality of hydrogen cabinets to deliver water to the cabinets. Alternatively, or additionally, the at least one water source may be operably connected to at least one water purification unit, when present, to deliver water to the at least one water purification unit.

Figure 3:
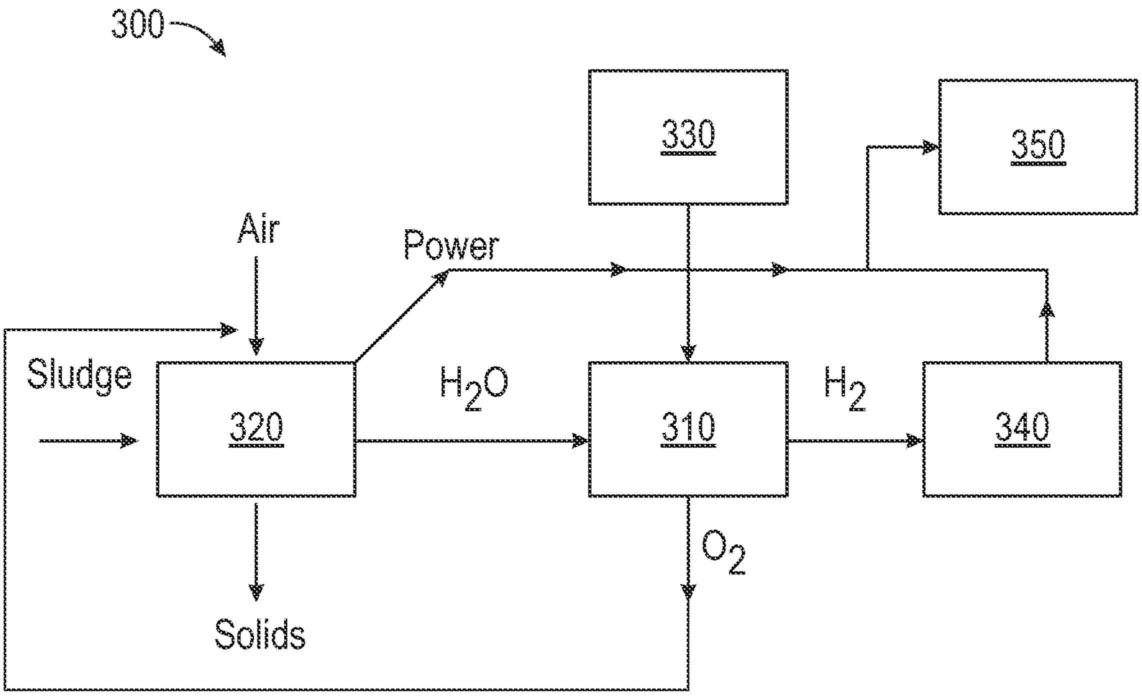
FIG. 3 is a flow chart showing a waste processing unit providing water and power to a system of the present disclosure.

In a preferred embodiment, the water source may include a waste processing unit, such as a septic waste system, as shown in FIG. 3. In the system 300 of FIG. 3, the hydrogen generation system 310 may be operably connected to a waste processing unit 320, a power source 330, one or more fuel cells 340, and a municipality or village 350. The hydrogen generation system 310 may provide hydrogen to the one or more fuel cells 340 for conversion into power or for use in other applications. Additionally, the hydrogen generation system may additionally produce oxygen that can be mixed with air and supplied to the waste processing unit 320. In some aspects, the waste processing unit 320 may be a pyrolysis unit. The waste processing unit 320 may take in sludge and air and process it to form solids, water, and power. In preferred embodiments when the waste processing unit 320 is a pyrolysis unit, the oxygen generated from the hydrogen generation system 310 is provided to the waste processing unit 320 to increase the efficiency of the pyrolysis reaction, especially if the pyrolysis unit is located at high altitudes. The water may be supplied to the hydrogen generation system 310, thus acting as a water source for the hydrogen generation system. The power generated by the waste processing unit 320 may be supplied a regional, local, or municipal power grid. The power grid may include a power source 330. Preferably, the power source 330 comprises renewable power sources, such as solar (including photovoltaics), wind, and other renewable sources. The power from the power source 330 and/or the waste processing unit 320 may be supplied to the hydrogen generation system 310 and/or to a municipality or village 350.

The system 100 may further comprise a header assembly. The header assembly is operable to collect the generated hydrogen, oxygen, hydrogen-derived gases, or other gases generated in the installation. Header assemblies are generally known and described in the art. The header assembly may be operably connected to the plurality of hydrogen cabinets 110 to collect the generated gases. In some aspects, the system may comprise more than one header assembly.

The system 100 may further comprise an input power switchgear. The input power switchgear is operable to provide power to the plurality of electronics cabinets 120, the plurality of hydrogen cabinets 110, and to other units within the system that require power. Power switchgears are generally known and described in the art, including those suitable for use in facilities that produce hydrogen. In a preferred embodiment, the input power switchgear is located on the ground floor of the installation. In embodiments wherein the system comprises one or more compressors, the header assembly may be operably connected to the one or more compressors. In preferred embodiments, the one or more compressors are downstream from the header assembly.

The system 100 may further comprise one or more hydrogen fuel cell generators to generate power from hydrogen and/or oxygen generated by the plurality of hydrogen cabinets. Each hydrogen fuel cell generators comprises at least one hydrogen fuel cell. Hydrogen fuel cells are well known and described in the art. The one or more hydrogen fuel cell generators may be operably connected to the plurality of hydrogen cabinets. Alternatively, or additionally, the one or more hydrogen fuel cell generators may be operably connected to one or more hydrogen storage units or oxygen storage units. In preferred embodiments when the system comprises one or more cooling loops, the one or more hydrogen fuel cell generators may be operably connected to the one or more cooling loops to provide heat exchange for the one or more hydrogen fuel cell generators. In additional preferred embodiments, the water produced by the hydrogen fuel cell may be optionally purified and used as a water source for the system.

The installation housing the system 100 may include a plurality of panels installed on the outer side walls of the installation. The panels may be staggered or placed with stand-off. The panels may be operable to allow air to freely pass into the aisles, thus providing cool air to the aisles. In preferred embodiments, the air allowed in from the panels may be introduced into the at least one duct assembly 130 via the one or more fans 140. In additional preferred embodiments, the panels may comprise photovoltaic panels to provide electricity to the system or to the installation as a whole. In some aspects, the panels may be modified to increase security, improve temperature control, and/or to improve the aesthetics of the installation.

The system 100 may further comprise one or more storage units to store gases produced by the system, such as gases produced by the plurality of hydrogen cabinets 110. Systems and methods for storing gases, particularly systems for storing hydrogen and oxygen, are well known and described in the art. The one or more storage units may be operably connected to the plurality of hydrogen cabinets 110. In some embodiments wherein the system comprises one or more compressors, the one or more storage units may be operably connected to the one or more compressors. In preferred embodiments, the one or more storage units may be located outside of the building comprising the system to increase safe operations of the system and to mitigate damage in the event of a failure.

The system 100 may further comprise one or more air inlets or air outlets to introduce cool air from outside the installation or exhaust warm from the aisles. The one or more air inlets or air outlets may include one or more fans to move air inside or outside the installation. The one or more air inlets or air outlets may be located on every floor of the installation, or they may be located on some floors but not others. The system may also comprise an insulating material.

Various modifications and additions can be made to the exemplary embodiments discussed without departing from the scope of the present invention. For example, while the embodiments, also referred to as implementations or examples, described above refer to particular features, the scope of this invention also includes embodiments having different combinations of features and embodiments that do not include all of the described features. Accordingly, the scope of the present invention is intended to embrace all such alternatives, modifications, and variations together and in various possible combinations of various different features of different embodiments combined to form yet additional alternative embodiments, with all equivalents thereof.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/m L" should also be understood to provide support for the range of "50 mg/m L to 80 mg/m L."

Features described above, as well as those claimed below, may be combined in various ways without departing from the scope hereof. It should thus be noted that the matter contained in the above description or shown in the accompanying drawings should be interpreted as illustrative and not in a limiting sense. Accordingly, many combinations, permutations, variations and modifications of the foregoing embodiments of inventions not set forth explicitly herein will nevertheless fall within the scope of this disclosure.

What is claimed is:

1. A system comprising:

a plurality of hydrogen cabinets, each hydrogen cabinet comprising a hydrogen generator;

a plurality of electronics cabinets; and at least one duct assembly operably connected to each of the plurality of hydrogen cabinets, wherein the plurality of hydrogen cabinets are positioned vertically relative to one another to form at least one hydrogen stack, such that at least one hydrogen cabinet of the plurality of hydrogen cabinets is on a first floor of a building and at least one hydrogen cabinet of the plurality of the hydrogen cabinets is on a second floor of the building above the at least one hydrogen cabinet on the first floor of the building, wherein the at least one hydrogen stack comprises a plurality of hydrogen stacks, wherein the plurality of hydrogen cabinets in two or more of the respective plurality of hydrogen stacks is separated by an aisle on each floor of the building, wherein the at least one duct assembly extends through each floor of the building, and wherein exhaust from the plurality of hydrogen cabinets is directed to the duct assembly.

2. The system of claim 1, wherein the plurality of electronics cabinets are positioned vertically relative to one another to form an electronics stack.

3. The system of claim 1, wherein the at least one duct assembly comprises:

an inner wall;

an outer wall; and one or more fans operable to direct air into the at least one duct assembly, wherein the one or more fans each form a passage from the outer wall to the inner wall of the at least one duct assembly.

4. The system of claim 3, wherein the duct assembly further comprises one or more cooling loops disposed between the inner wall and the outer wall.

5. The system of claim 4, wherein the one or more fans is operable to direct air to the one or more cooling loops.

6. The system of claim 4, wherein the one or more cooling loops is operably connected to a heat capture loop.

7. The system of claim 1, wherein the exhaust from the plurality of hydrogen cabinets comprises at least one of air, hydrogen, or oxygen.

8. The system of claim 1, further comprising one or more compressors operably connected to the at least one hydrogen stack.

9. The system of claim 1, further comprising an input power switchgear.

10. The system of claim 1, further comprising at least one water purification unit.

11. The system of claim 10, further comprising at least one booster pump, wherein the at least one booster pump is operable to provide purified water to each of the plurality of hydrogen cabinets at a uniform pressure.

12. The system of claim 1, further comprising a water source operably connected to the plurality of hydrogen cabinets.

13. The system of claim 12, wherein the water source comprises an adsorber operable to adsorb water from the air.

14. The system of claim 12, wherein the water source comprises a waste processing unit.

15. The system of claim 12, wherein the water source comprises rainwater.

16. The system of claim 1, further comprising a plurality of panels.

17. The system of claim 16, wherein the plurality of panels comprise photovoltaic panels.

18. The system of claim 1, further comprising at least one hydrogen fuel cell generator cabinet.

19. The system of claim 1, further comprising a heat storage system, wherein the heat storage system comprises a saline solution.

20. The system of claim 1, wherein the two or more hydrogen cabinets of the plurality of hydrogen cabinets are fluidly connected to a single duct assembly, and the two or more hydrogen cabinets are positioned on two or more sides of the single duct assembly.

* * * * *